United States Patent
Sarkar et al.

(10) Patent No.: US 10,377,938 B2
(45) Date of Patent: *Aug. 13, 2019

(54) NANOPARTICLE SMART TAGS IN SUBTERRANEAN APPLICATIONS

(75) Inventors: Diptabhas Sarkar, Houston, TX (US); Charles Landis, The Woodlands, TX (US); Ryan P. Collins, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/285,550

(22) Filed: Oct. 31, 2011

(65) Prior Publication Data

US 2013/0109100 A1  May 2, 2013

(51) Int. Cl.
| | |
|---|---|
| G01N 33/24 | (2006.01) |
| C09K 8/03 | (2006.01) |
| C09K 8/60 | (2006.01) |
| C09K 8/62 | (2006.01) |
| C04B 40/00 | (2006.01) |
| C09K 8/467 | (2006.01) |
| G01N 33/00 | (2006.01) |

(52) U.S. Cl.
CPC ............ *C09K 8/03* (2013.01); *C04B 40/0096* (2013.01); *C09K 8/467* (2013.01); *C09K 8/60* (2013.01); *C09K 8/62* (2013.01); *C09K 2208/10* (2013.01)

(58) Field of Classification Search
CPC ... C09K 8/03; C09K 8/60; C09K 8/62; C09K 2208/10; C09K 8/467; C04B 40/0096
USPC .................................... 436/27; 977/902, 773
See application file for complete search history.

(56) References Cited

U.S. PATENT DOCUMENTS

| | | | |
|---|---|---|---|
| 4,447,340 A | 5/1984 | Fery | |
| 4,807,469 A | 2/1989 | Hall | |
| 5,120,708 A * | 6/1992 | Melear et al. | ................ 507/126 |
| 5,783,822 A | 7/1998 | Buchanan et al. | |
| 6,030,928 A * | 2/2000 | Stahl et al. | ................... 507/121 |
| 6,659,175 B2 | 12/2003 | Malone et al. | |
| 6,725,926 B2 | 4/2004 | Nguyen et al. | |
| 2005/0084980 A1 * | 4/2005 | Koo | ......................... G01J 3/44 436/171 |
| 2009/0178921 A1 | 7/2009 | Lawrence et al. | |
| 2009/0288820 A1 * | 11/2009 | Barron | ..................... B01J 13/02 166/249 |
| 2010/0119697 A1 | 5/2010 | Baran, Jr. | |
| 2010/0193184 A1 * | 8/2010 | Dolman et al. | ............ 166/253.1 |
| 2010/0314108 A1 * | 12/2010 | Crews et al. | ............ 166/250.12 |
| 2011/0048969 A1 | 3/2011 | Lawrence et al. | |
| 2011/0214488 A1 | 9/2011 | Rose et al. | |
| 2011/0240287 A1 | 10/2011 | Hartshorne et al. | |
| 2012/0325465 A1 * | 12/2012 | Hammer | ............. E21B 47/1015 166/254.1 |
| 2013/0109597 A1 | 5/2013 | Sarkar et al. | |

FOREIGN PATENT DOCUMENTS

| | | |
|---|---|---|
| WO | 2010026456 A2 | 3/2010 |
| WO | WO 2011/073747 A2 | 6/2011 |
| WO | WO 2011/076874 A1 | 6/2011 |
| WO | WO 2012/082481 A2 | 6/2012 |
| WO | 2013066514 A1 | 5/2013 |
| WO | 2013066515 A1 | 5/2013 |

OTHER PUBLICATIONS

New Functional Tracers Based on Nanotechology and Radiotracer Generators, Department for Reservoir and Exploration Technology (RELE), SIP 2007-2009, pp. 1-23, retrieved from the Internet: URL:http://www.ife.no/departments/reservoir_and exploration_tech/files/nanostrategirele2007-2009/fss_download/Attachmentfile, Sep. 17, 2007.
International Search Report and Written Opinion for PCT/US2012/056646 dated Feb. 4, 2013.
International Search Report and Written Opinion for PCT/US2012/056631 dated Feb. 4, 2013.
High Tech Center "Chem Rar" Edition No. 9-10, 2009, retrieved from http://www.biorosinfo.ru/biotechnologia/ChemRar_digest_09-10_2009.pdf, 2 pages.
Russian Office Action from Russian Application No. 201490904/31, dated Jun. 21, 2017, 3 pages.
Mockovciakova et al., "Adsorption properties of modified bentonite clay," Chemine Technologija, 2009, No. 1, vol. 50, pp. 47-50.
Shahwan et al., "Synthesis and characterization of bentonite/iron nanoparticles and their application as adsorbent of cobalt ions," Applied Clay Science, 2010, vol. 47, pp. 257-262.

* cited by examiner

*Primary Examiner* — Rebecca M Fritchman
(74) *Attorney, Agent, or Firm* — Tenley Krueger; C. Tumey Law Group PLLC

(57) ABSTRACT

The present invention relates to nanoparticle smart tags and the use of nanoparticle smart tags in the detection of analyte. In particular, the present invention relates to nanoparticle smart tags that may be used in subgeologic formations to detect analytes of interest in real-time. One embodiment of the present invention provides a method of providing a drilling fluid having a nanoparticle smart tag; and a base fluid; and introducing the drilling fluid in a subsurface geologic formation that has an analyte.

18 Claims, No Drawings

NANOPARTICLE SMART TAGS IN SUBTERRANEAN APPLICATIONS

BACKGROUND

The present invention generally relates to the field of nanotechnology and drilling fluids. More particularly, the present invention relates to nanoparticle smart tags and the use of nanoparticle smart tags in the detection of chemical species.

Drilling is a crucial process for recovering economically important materials found in subterranean environments. For example, drilling may be used to recover oil, precious metals, water, and other natural resources. Because of the large expenses involved in subterranean explorations, it is often important to quickly determine the commercial viability of a wellbore. For mineral exploration, a detection scheme may be used to determine whether an ore contains sufficiently high concentrations of minerals. In the case of groundwater drilling, a detection scheme can provide a careful analysis of the chemical compositions present in groundwater, checking for possible contaminants to fresh water sources.

Detection schemes typically require the use of tags which interact with the chemical species of interest (i.e., an analyte), which in turn can be analyzed by a number of analytical techniques. As used herein, a "tag" refers to a composition that aids in the detection of an analyte. In a typical analytical setup, the physical (e.g., temperature, concentration, location, etc.) and/or chemical (e.g., reactivity, toxicity, oxidation state, etc.) properties of an analyte may be measured directly or indirectly wherein the analyte's interaction with a tag alters a measurable property of the analyte, tag, or both. The interaction between the tag and the analyte may be via electrostatic interaction, chemical bond, adsorption (physical or chemical), etc. Examples of tags include, but are not limited to, organic dyes, fluorescent antibodies, radioisotopes, and nanoparticles.

Analytical tools such as spectroscopy are generally used in a detection scheme to detect the chemical species once the interaction has occurred. The challenge for current detection scheme, is to be able to detect low amounts of analyte in a chemically complex environment. Another limitation of current detection schemes is the amount of time required to analyze the chemical composition present in a given wellbore. In a typical setup, samples need to be collected, time stamped, sent to a remote site for analysis, and then analyzed. It is not uncommon for this process to take several days, if not weeks.

SUMMARY OF THE INVENTION

The present invention generally relates to the field of nanotechnology and drilling fluids. More particularly, the present invention relates to nanoparticle smart tags and the use of nanoparticle smart tags in the detection of chemical species.

Some embodiments of the present invention provide methods comprising: providing a drilling fluid comprising: a nanoparticle smart tag; and a base fluid; and introducing the drilling fluid in a subsurface geologic formation comprising an analyte.

Other embodiments of the present invention provide methods comprising: providing a drilling fluid comprising: a nanoparticle smart tag; a base fluid; and a bentonite composition; and introducing the drilling fluid in a subsurface geologic formation comprising an analyte; and detecting a property selected from the group consisting of: chemical composition of the analyte; presence or absence of the analyte; concentration of the analyte; specificity of the analyte; in situ temperature of the analyte in the subsurface geologic formation, and any combination thereof.

The features and advantages of the present invention will be readily apparent to those skilled in the art upon a reading of the description of the preferred embodiments that follows.

DETAILED DESCRIPTION

The present invention generally relates to the field of nanotechnology and drilling fluids. More particularly, the present invention relates to nanoparticle smart tags and the use of nanoparticle smart tags in the detection of chemical species.

One of the many advantages of the present invention is that the fluids and suspensions of the present invention provides highly sensitive and selective nanoparticle smart tags for the detection of analytes. As used herein, a "smart tag" is an identifiable substance that can interact with analytes of interest in order to quickly provide information on the physical and/or chemical property of the analyte. In particular, a nanoparticle smart tag interacts specifically with an analyte of interest and may be used to measure one or more properties of the analyte. The interaction between the tag and the analyte may be via electrostatic interaction, chemical bond, adsorption (physical or chemical), etc. Such interactions can form a nanoparticle smart tag analyte complex. As used herein, an "analyte" generally refers to a substance or chemical constituent, generally a constituent that is economically and/or ecologically important, which is determined in an analytical procedure. Analytes can be any chemical species, including compounds, ions, polymers, organic molecules, and the like.

The nanoparticle smart tags used in the present invention are extremely versatile tags for analytes. The nanoparticle smart tags may be surface coated or functionalized before being used as tags. Such surface modifications can be used to regulate stability, solubility and targeting. Nanoparticle smart tags can be tracked and identified by general analytical methods such as spectroscopy, plasmon resonance imaging, spectrometry (e.g., inductively coupled plasma mass spectrometry), chromatography (e.g., ion chromatography), fluorescence microscopy, and fluorescence imaging. Use of nanoparticle smart tags may be particularly advantageous in cases where the properties of analytes cannot be directly measured.

The nanoparticle smart tags of the present invention may be suspended in any subterranean treatment fluid and introduced into a subterranean environment. Suitable examples of subterranean treatment fluid include, but are not limited to, a drilling fluid, a drill-in fluid, a fracturing fluid, a cement slurry, a displacement fluid, and a stimulation fluid. The mixture of nanoparticle smart tags and a subterranean treatment fluid will typically form a suspension. In some embodiments, this suspension may be introduced into a subterranean environment and allowed to interact with an analyte of interest to form a nanoparticle smart tag analyte complex. In some cases, a mixture of nanoparticle smart tag analyte complex, unbound nanoparticle smart tags, and unbound analyte may exist. In some embodiments, once the nanoparticle smart tag and analyte interacts, a sample may be collected (e.g., up at the surface.) It may be desirable for each sample to be time-stamped for immediate or later analysis.

In some embodiments, the fluids and suspensions of the present invention may be used as drilling fluids in precious metal/mineral exploration and ground water industrial drilling applications to identify the presence and absence of certain analytes. The fluids of the present invention may also be used to quantitatively measure the concentrations of analytes of interest in drill solids (e.g., drill cuttings), crushed geologic field samples, and produced groundwaters in water wells and mineral exploration wells. It is believed that the fluids of the present invention will provide a cost effective ability to identify metals during drilling processes thereby saving money involved in elemental assays. The methods of the present invention are amenable to both on-site and off-site analysis. In some cases, real-time analysis of an analyte may be provided within minutes. In particular, when the fluids are used with on-site detection systems, it is believed that samples may be analyzed in real time, which could also save valuable time in the exploration of analytes. The analysis may be performed by recovering at least a portion of the return fluid to the surface or downhole, or may be performed using analysis methods along the drill string for in situ analysis.

In some preferred embodiments, the nanoparticle smart tags of the present invention may comprise nanoparticles that are inert in geologic environments and resist degradation. As used herein, "nanoparticle" generally refers to a small particle having a diameter between 1-2500 nanometers. Nanoparticles may also refer to other small objects having at least nanoscale dimensions. For example, a nanorod or a quantum dot may be considered a nanoparticle. Nanoparticles may be specifically engineered to detect analytes of interest. Because of their small size, it is expected that nanoparticles will go through porous media as rock structures without being sieved out. The nanoparticles should also flow easily with drilling fluids. Many nanoparticles have unique and highly tunable optical signatures that make them ideally suitable as smart tags. For example, the absorption and emission ranges of the nanoparticle smart tags are well suited to be tuned so as to reduce overlap with background signals that may arise from chemically complex environments.

The fluids of the present invention generally comprise a nanoparticle smart tag that is specific for an analyte and a base fluid. In general, when the analyte is present, the nanoparticle smart tag will interact with the analyte to form a nanoparticle smart tag analyte complex. In some cases, a mixture of nanoparticle smart tag analyte complex, unbound nanoparticle smart tags, and unbound analyte may exist. These fluids may be drilling fluids used in geologic applications. In some embodiments, the nanoparticle smart tag may be suspended in a drilling fluid. Optionally, the fluids may also comprise a viscosifier, such as a bentonite composition. Bentonite is an aluminum phyllosilicate often used in drilling fluids as a viscosifier. Bentonite is an adsorbent clay which expands to retain water and it is useful in drilling fluids because of its excellent colloidal properties. Relatively small amounts of bentonite in water form viscous, shear thinning fluid, making it an important component in drilling muds. In a typical analytical detection scheme, at least one measurable property (e.g., fluorescence, conductivity, light absorption, etc.) arising from the analyte (e.g., after interacting with a smart tag), smart tag, or both is detected. In some cases, the observed signal is the altered signal (e.g., blue shift or red shift in absorption spectroscopy) that arises when an analyte interacts with the nanoparticle smart tag, that is, the analyte and the nanoparticle smart tag are coordinated and/or complexed with a smart tag. In some embodiments, a change in the environment may lead to an alteration in the analytical signal. The nanoparticle smart tags of the present invention may be able to detect a property of an analyte present in a concentration as low as about 2 ppm.

Without being limited by theory, it is believed that the nanoparticle smart tags of the present invention may become embedded in bentonite when they are used together. Nanoparticle smart tags embedded within bentonite may provide enhanced analytical signals because of the local concentration of nanoparticle smart tags. The nanoparticle smart tags and bentonite may be prepared and packaged in powdered form. Suitable bentonite includes granular Wyoming natural sodium bentonite, calcium bentonite and potassium bentonite. Factors such as mineral content, cost, and availability may determine the bentonite used. Wyoming natural sodium bentonite may be particularly useful because of its subeconomic levels of precious minerals. As used herein, "subeconomic" refers to identified resources that are not economically profitable to extract from.

The bentonite compositions of the present invention may be granular. In some embodiments, the mean particle size of the bentonite is from about 20 microns to about 1 mm. In some embodiments, about 50% to about 90% of the bentonite has a particle size less than about 75 microns. The bentonite may be present in about 0.5% to about 20% by weight of the fluids.

The nanoparticle smart tag component of the present invention may comprise any known nanoparticles compatible with subterranean formations including, but not limited to, quantum dots including quantum dots of cadmium selenide, cadmium sulfide, indium arsenide, indium phosphide, copper indium sulfide, zinc sulfide, and the like; carbon nanoparticles including carbon cage structures like fullerenes and carbon nanotubes (single and multi-walled), graphenes (single and multilayered), and nanodiamonds; polymeric nanoparticles including nanoparticles of gums, chitosans, gelatins, sodium alginates, albumins, cellulosics, poly(ethylene imines), poly(ethylene glycols), poly(propylene glycols), poly(acrylic acids), poly(vinyl alcohols), methacrylates, acrylates, poly(2-hydroxy ethyl methacrylates), poly (methyl methacrylates), poly(methyacrylic acids), poly (vinyl pyrrolidones), acrylamides, poly(acrylamides), poly (ethylene-co-vinyl acetates), polylactides, polyglycolides, polyanhydrides, polyorthoesters, polycyanoacrylates, polycaprolactone, and copolymers thereof; dendrimers including 2nd or higher generation dendrimers and 2nd or higher generation dendrons; ceramic nanoparticles including nanoclays and nanoparticles of composite ceramics, carbides, borides, nitrides, siilcides, and oxides like silicas, aluminas, beryllias, cerias, and zirconias; core-shell nanoparticles including multi-shell nanoparticles, also known as onionated nanoparticles; metal nanoparticles including nanoparticles of gold, silver, iron, copper, nickel, zinc, tin, and any combination thereof; metal oxide nanoparticles including oxides of chromium, manganese, iron, cobalt, nickel, copper, zinc, molybdenum, indium, tin, lead, gadolinium, erbium, any oxidation state thereof, and any combination thereof; nanowires including nanowires of metals, semimetals, metal oxides, ceramics, and any combination thereof; diamond nanosensors; functionalized derivatives thereof including water-dispersible derivatives and oil-dispersible derivatives; and any combination thereof.

Nanoparticles suitable for use in the present invention may be engineered to specifically detect certain analytes. Suitable engineering methods may include, but not be limited to, controlling physical properties of the nanoparticles like size, shape, and crystal structure; functionalizing the nanoparticles (covalently or non-covalently) with analyte-reactive moieties, thermally unstable moieties, chelating moieties, antibodies and the like; and any combination thereof. In some embodiments, multiple nanoparticles and/or multiple engineering methods may be used to detect more than one analyte.

The nanoparticles of the present invention may be engineered to selectively detect certain analytes. In some embodiments, the nanoparticle smart tags may be specific for analytes such as oxides, hydroxides, minerals, coordinated mineral structures, and combinations thereof. In some embodiments, the nanoparticle smart tag may be a marker for an analyte, a microparticle, another nanoparticle, and any combination thereof. Suitable examples of analytes include gold, silver, arsenic, iron, lead, uranium, copper, platinum, chromium, calcium, magnesium, mercury, zinc, selenium, molybdenum, lanthanum, cerium, praseodymium, neodymium, promethium, samarium, europium, gadolinium, terbium, dysprosium, holmium, erbium, thulium, ytterbium, lutetium, sulfide, sulfide mineralization deposit and any combination thereof.

The base fluid component of the present invention may include a fluid loss control agent, a clay inhibitor, a lubricant, a weighting agent, a viscosifier (including clay-based viscosifiers such as bentonite), and any combination thereof. In some cases, the base fluid may be aqueous, non-aqueous, oil-based, or synthetic.

The present invention generally provides methods that comprise providing a fluid comprising a nanoparticle smart tag and a base fluid and introducing the fluid in a subsurface geologic formation. Optionally, the fluids may further comprise bentonite compositions. Optionally, the methods may further comprise detecting physical and/or chemical properties of the analytes. Suitable properties include chemical composition of the analyte, presence or absence of the analyte, concentration of the analyte, specificity of the analyte, in situ temperature of the analyte in the subsurface geologic formation, and any combination thereof. In some embodiments, the fluid is introduced into the subsurface geologic formation in drilling and monitoring applications. In some embodiments, the fluid may be a drilling or treatment fluid. Without being limited by theory, it is believed that a given property of analytes may be mapped to a geologic depth via real time on-line analysis of on-the-time stamped fluids. The in situ temperatures of the analytes may be determined by engineering the nanoparticle smart tags to undergo irreversible temperature dependent transitions.

Analytical detection of the analytes may be achieved by several methods. Suitable methods include a visual inspection, a microscopic method, a spectroscopic method, a spectrometric method (e.g., ICP), a chromatography method (e.g., ion chromatography), an assay method, a gravimetric method, and any combination thereof. In some embodiments, the spectroscopic method detects absorption, emission, fluorescence, scattering, or any combination thereof. The spectroscopic signals may originate from the nanoparticles, a functional group on the nanoparticles, or the analytes. In some embodiments, the spectroscopic signal may be from any combination of the nanoparticle, the functional group on the nanoparticle, and the analyte (e.g., after interacting with the nanoparticle).

It is believed that when drill bits reach a rock stratum that has a target ore, ions of the specific metal will leach into the drilling fluids. These metal ions will likely interact with the nanoparticle smart tags of the present invention and alter the resulting analytical signal. In some embodiments, the detection is made in situ downhole, on-line in a wellhead, off-line or after drilling is completed. For example, a suitable on-line real-time technique may be a scattering method wherein the detectors are located on a drill head. A suitable off-line technique may be microscopy or visual inspection wherein samples are collected and analyzed outside the wellbore. The detections can be made immediately, i.e., real-time or any time thereafter, as convenient for the user.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed:

1. A method comprising: providing a drilling fluid comprising: a nanoparticle smart tag; and a base fluid; and introducing the drilling fluid in a subsurface geologic formation comprising an analyte such that the nanoparticle smart tag interacts with the analyte within the subterranean formation to form a nanoparticle smart tag analyte complex;

circulating a portion of the drilling fluid to the well surface and collecting a sample of the drilling fluid containing the nanoparticle smart tag analyte complex at the well surface, wherein the nanoparticle smart tag interacts with the analyte via a chemical bond or adsorption, and wherein the nanoparticle smart tag comprises an analyte-reactive moiety that specifically reacts with the analyte to detect the analyte, wherein the analyte comprises at least one material selected from the group consisting of: gold, silver, arsenic, iron, lead, uranium, copper, platinum, chromium, calcium, magnesium, mercury, zinc, selenium, molybdenum, lanthanum, cerium, praseodymium, neodymium, promethium, samarium, europium, gadolinium, terbium, dysprosium, holmium, erbium, thulium, ytterbium, lutetium, sulfide, sulfide mineralization deposit, and any combination thereof.

2. The method of claim 1 further comprising: detecting a property selected from the group consisting of: chemical composition of the analyte; presence or absence of the analyte; concentration of the analyte; specificity of the analyte; in situ temperature of the analyte in the subsurface geologic formation, and any combination thereof.

3. The method of claim 2 wherein the detection is achieved by a method selected from the group consisting of: a visual inspection, a microscopic method, a spectroscopic method, a spectrometric method, a chromatography method, an assay method, a gravimetric method, and any combination thereof.

4. The method of claim 1 wherein the analyte comprises an element selected from the group consisting of: an ion, a mineral, a coordinated mineral structure, and any combination thereof.

5. The method of claim 1 wherein the nanoparticle smart tag is surface modified.

6. The method of claim 3 wherein the spectroscopic signal is from the nanoparticle smart tag, a functional group on the nanoparticle smart tag, or the analyte.

7. The method of claim 1 wherein the drilling fluid is introduced into the subsurface geologic formation in a drilling and monitoring application.

8. The method of claim 2 wherein the detection is made in situ downhole, on-line in a wellhead, off-line, or after drilling is completed.

9. The method of claim 2 wherein the detection occurs in real-time or thereafter.

10. The fluid of claim 1 wherein the base fluid is aqueous, non-aqueous, oil-based, or synthetic.

11. A method comprising: providing a drilling fluid comprising: a nanoparticle smart tag; a base fluid; and a bentonite composition; and introducing the drilling fluid in a subsurface geologic formation comprising an analyte such that the nanoparticle smart tag interacts with the analyte to form a nanoparticle smart tag analyte complex; and
   circulating a portion of the drilling fluid to the well surface and collecting a sample of the drilling fluid containing the nanoparticle smart tag analyte complex at the well surface,
   detecting a property selected from the group consisting of: chemical composition of the analyte; presence or absence of the analyte; concentration of the analyte; specificity of the analyte; in situ temperature of the analyte in the subsurface geologic formation, and any combination thereof by analyzing the nanoparticle smart tag analyte complex,
   wherein the nanoparticle smart tag interacts with the analyte via a chemical bond or adsorption, and
   wherein the nanoparticle smart tag comprises an analyte-reactive moiety that specifically reacts with the analyte to detect the analyte,
   wherein the analyte comprises at least one material selected from the group consisting of: gold, silver, arsenic, iron, lead, uranium, copper, platinum, chromium, calcium, magnesium, mercury, zinc, selenium, molybdenum, lanthanum, cerium, praseodymium, neodymium, promethium, samarium, europium, gadolinium, terbium, dysprosium, holmium, erbium, thulium, ytterbium, lutetium, sulfide, sulfide mineralization deposit, and any combination thereof.

12. The method of claim 11 wherein the nanoparticle smart tag comprises at least material selected from the group consisting of: a quantum dot, a carbon nanoparticle, a polymeric nanoparticle, a dendrimer, a ceramic nanoparticle, a core-shell nanoparticle, a metal nanoparticle, a metal oxide nanoparticle, a nanowire, a diamond nanosensor, a functionalized derivative thereof, and any combination thereof.

13. The method of claim 11 wherein the detection is achieved by a method selected from the group consisting of: a visual inspection, a microscopic method, a spectroscopic method, a spectrometric method, a chromatography method, an assay method, a gravimetric method, and any combination thereof.

14. The method of claim 11 wherein the analyte comprises an element selected from the group consisting of: an ion, a mineral, a coordinated mineral structure, and any combination thereof.

15. The method of claim 11 herein the analyte comprises a material selected from the group consisting of: a marker for an analyte, a microparticle, another nanoparticle, and any combination thereof.

16. The method of claim 11 wherein the bentonite composition has a mean particle size of about 20 µm to about 1 mm.

17. The method of claim 11 wherein about 50% to about 90% of the bentonite composition has a particle size less than about 75 µm.

18. The method of claim 11 wherein the bentonite composition is present in about 0.5% to about 20% by weight of the drilling fluid.

* * * * *